July 4, 1950 M. RACHLIN 2,514,256
DOWNSPOUT HOOK AND METHOD OF MAKING SAME
Filed June 18, 1948
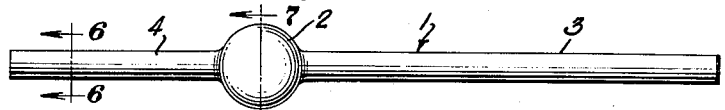
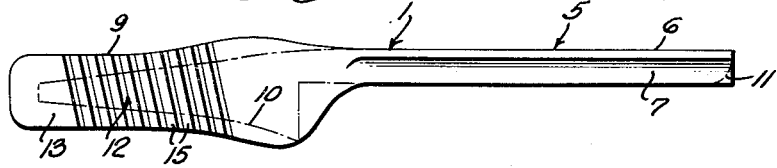
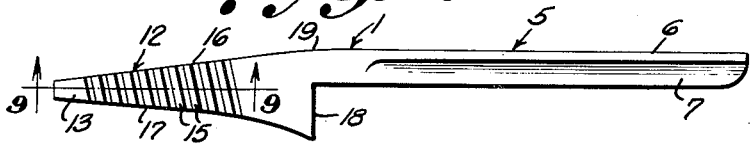
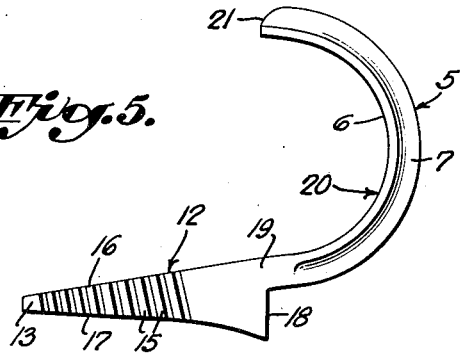
Inventor
MAX RACHLIN
By Almon S. Nelson
ATTORNEY

Patented July 4, 1950

2,514,256

UNITED STATES PATENT OFFICE 2,514,256

DOWNSPOUT HOOK AND METHOD OF MAKING SAME

Max Rachlin, Flushing, N. Y.

Application June 18, 1948, Serial No. 33,894

3 Claims. (Cl. 248—71)

1

This invention relates to a downspout hook and method of making same, and the primary object of the invention is to provide a new and improved hook and process of its manufacture from a strip of metal stock, such as wire stock, having any desired cross-sectional configuration such as round, square, rectangular, triangular, etc., whereby a greatly reinforced, strong, hardened hook is produced.

Another object of the invention is to provide a downspout hook from a strip of metal stock, such as wire stock, which possesses greater strength than the strength of the metal initially, and one which has no weakened twisted portions and is not damaged by hammering.

A further object of the invention is to provide a downspout hook formed from a strip of metal stock, such as wire stock, in which the driving tang is generally offset from but merges into one end of the hook portion, the driving end of the driving tang and that portion of the hook where the hook portion thereof connects with or merges into the driving tang is of thickened or reinforced construction, and the hook portion is reinforced by an exterior flattened rib portion, whereby the downspout hook, as thus strengthened, is insured of a permanent configuration, whether the hook portion be semi-circular, semi-hexagonal, or any other configuration.

An additional object of the invention relating to the method of forming the downspout hook, is to upset or otherwise thicken the metal blank from which the hook is formed at that portion thereof which ultimately becomes the driving end portion of the driving tang and the connecting or merging portions of the tang and hook portion.

Other objects of the invention will become apparent as the description proceeds, reference being made to the accompanying drawing forming a part of the present disclosure, wherein:

Fig. 1 is a plan view of a strip of metal, such as wire stock, after it has been cut to proper length and illustrating as the second step of my invention one form of upset or metal thickening step that may be performed in the formation of my downspout hook;

Fig. 2 is a plan view of the strip of metal after the hook portion thereof has been die pressed and the other end portion thereof laterally offset therefrom and connected thereto by a bend, illustrating the third step in the formation of the hook;

Fig. 3 is a plan view of the strip of metal after

2 the driving tang and that portion of the hook portion merging therewith have been die-pressed, illustrating the fourth step in the formation of the hook;

Fig. 4 is a plan view of the strip of metal after it has been trimmed, illustrating the fifth step in the formation of the hook;

Fig. 5 is a side elevational view of one of the completed hooks, illustrating in this instance the hook portion bent into the form of a semi-circle, which is the sixth and final step in the formation of the hook;

Figs. 6 and 7 are enlarged sectional views taken along the lines 6—6 and 7—7, respectively, of Fig. 1, looking in the direction of the arrows;

Figs. 6a and 7a are sectional views similar to Figs. 6 and 7, respectively, illustrating modified cross-sectional configurations of the wire stock and the upset, respectively;

Fig. 8 is a sectional view taken along the line 8—8 of Fig. 2, looking in the direction of the arrows;

Fig. 9 is an enlarged sectional view taken along the line 9—9 of Fig. 4, looking in the direction of the arrows; and Fig. 10 is a fragmentary plan view of a strip of metal illustrating a further modified form of upset.

Referring now to the drawing, wherein Figs. 1 to 9 illustrate the hook and one manner of making it, a strip of metal stock, such as wire stock, of steel, stainless steel, copper, or any other metal, is first cut to a length slightly longer than the length of the finished hook.

This blank or length of wire 1 is then preferably upset to provide an upset or thickened portion 2, as illustrated in Fig. 1. The exact point at which the thickened portion or upset 2 is formed in the blank 1 will depend upon the length of the hook portion relative to the length of the driving tang, but in any event will approximate the point at which the driving tang merges into the hook portion of the hook, i. e., at the driving end portion of the driving tang, whereby an increased mass of metal is provided as such merging point. Thus, as illustrated in Fig. 1, the upset 2 divides the blank 1 substantially into a hook portion 3 and a driving tang portion 4. Although it is preferred to form the thickened portion 2 by an upsetting process, insofar as the invention is concerned such thickened portion may be formed by other processes, if desired, such as forging, etc.

As the next step in the process, illustrated in Fig. 2, the hook portion 3 of the blank 1 is die-pressed to provide a finished, pressed hook 5 having substantially a T-shape in cross-section as illustrated in Fig. 8. The hook portion 5 thus comprises a relatively wide downspout engaging surface 6 and an outstanding reinforcing rib 7.

Simultaneously with the die-pressing of the hook portion 3, the driving tang portion 4 including the upset 2 are offset from the hook portion by bending the blank as indicated at 8. The axes of the portions 4 and 5 at this stage may be said to be spaced and substantially parallel.

The next step in the process is to die-press or flatten the driving tang portion 4 including the upset or thickened portion 2, as illustrated in Fig 3, and this step is followed by a trimming step in which the flattened tang portion 9 is trimmed along the broken line 10 and the free end of the hook portion 5 is trimmed along the broken line 11 to give the blank 1 the shape illustrated in Fig. 4.

As indicated in Figs. 3, 4, 5 and 9, the flattening step provides a driving tang 12 having tapering opposed surfaces 13, 14 provided with serrations 15, and the tang 12 is so trimmed as to provide tapering side edges 16, 17.

It will be obvious that the upset or thickened portion 2, when flattened, provides a thickened and highly reinforced driving end portion 18 for the driving tang offset from the hook portion 5, as well as a thickened and highly reinforced portion 19 where the driving tang 12 merges into the hook portion 5.

The final step in the process is to bend the hook portion 5 into its desired configuration to form the finished hook 20 illustrated in Fig. 5. The downspout hook of the present invention is adapted to be used with downspouts of various cross-section, such as circular, rectangular, hexagonal or any other particular shape. The form of hook chosen for illustration is adapted to be used with a circular downspout and hence as illustrated, the hook portion 5 is bent into the form of a semi-circle. Obviously, however, the hook portion 5 may be given a semi-hexagonal shape to receive a hexagonal downspout, or it may be given substantially a U-shape to receive a rectangular downspout.

The downspout hook 20 provided by my invention is of unusually strong and rigid construction. The reinforced driving end of the tang is not damaged by hammering even when driven into mortar or masonry. In addition, the thickened and reinforced merging portion 19 functions to eliminate bending at this point and thus movement of the free end 21 of the hook portion 5 relative to the tank 12 is eliminated, even when the tang is driven into mortar or masonry.

Fig. 6a illustrates that the wire blank 1 need not necessarily have a circular cross-section, but may, if desired, have a rectangular or square cross-section as indicated at 1'.

Fig. 7a similarly illustrates that the upset or thickened portion 2 need not necessarily have a circular cross-section but may have any desired cross-sectional configuration such as rectangular or square, as indicated at 2', and Fig. 10 illustrates that the upset or thickened portion 2" may be elongated if desired.

It will be obvious, of course, that the strip or wire stock may have any desired cross-sectional shape, and that the upset or thickened portion may have any desired shape and need not necessarily be formed symmetrical with respect to the axis of the blank. All of the thickened portion may be formed on one side of the axis of the blank if desired, and, as pointed out above, it is immaterial how such thickened portion is formed. In fact, the thickened portion may be so shaped and positioned as to eliminate the need for the bend 8, Fig. 2.

From the preceding description, it will be seen that I have provided a downspout hook cold worked from a strip of metal stock, such as wire stock, in which the driving end of the driving tang and that portion of the hook where the hook portion thereof merges into the driving tang is of thickened or reinforced construction, and in which the hook portion is of reinforced construction, whereby the downspout hook, as thus strengthened, is insured of a permanent configuration, the driving end of the tang is not damaged by hammering, and bending at the point where the tange merges into the hook portion is eliminated, even though the tang be driven into mortar or masonry.

Other modes of applying the principle of my invention may be employed instead of the ones explained, change being made as regards the article and the steps herein disclosed, provided those stated by any of the following claims or their equivalent be employed.

I claim:

1. In a downspout hook cold worked from strip metal stock, comprising a tapered driving tang formed of pressed metal stock and a hook portion formed from the same stock, said hook portion having a plane inner face and a reinforced permanent configuration, said driving tang merging into said hook portion and having a driving end offset therefrom, means for substantially eliminating bending in said hook at the point of merging of said hook portion with said driving tang during the driving of said tang, said means consisting of an increased mass of metal at the merging point.

2. In a method of making a downspout hook cold worked from strip metal stock, said hook comprising a tapered driving tang and a hook portion of reinforced permanent configuration, said driving tang merging into said hook portion and having a driving end offset therefrom, the steps comprising forming a thickened portion in a strip metal blank substantially at the point of merging of said hook portion with said driving tang, whereby an increased mass of metal is provided at such merging point, then pressing said metal blank including said thickened portion to strengthen and taper two opposed surfaces of one end portion thereof to partially form said driving tang and to strengthen and reinforce the other end portion thereof, trimming said one end portion of said blank to finally form said driving tang, and bending said other end portion of said blank to form said hook portion; said increased mass of metal substantially eliminating bending in said hook at the point of merging of said hook portion with said driving tang during the driving of said tang.

3. In a method of making a downspout hook cold worked from strip metal stock, said hook comprising a tapered driving tang and a hook portion of reinforced permanent configuration, said driving tang merging into said hook portion and having a driving end offset therefrom, the steps comprising forming a thickened portion in a strip metal blank substantially at the point of merging of said hook portion with said driving tang, whereby an increased mass of metal is provided at such merging point in one end portion of said blank, pressing the other end portion of said metal blank to strengthen and reinforce said other end portion thereof and simultaneously imparting a bend in said blank between said end portions, pressing said one end portion of said metal blank including said thickened portion to strengthen and taper two opposed surfaces of said one end portion to partially form said driving tang, trimming said one end portion of said blank to finally form said driving tang, and bending said other end portion of said blank to form said hook portion, said increased mass of metal substantially eliminating bending in said hook at the point of merging of said hook portion with said driving tang during the driving of said tang.

MAX RACHLIN.

REFERENCES CITED

The following references are of record in the file of this patent:

UNITED STATES PATENTS

| Number | Name | Date |
|---|---|---|
| 2,365,971 | Rachlin | Dec. 26, 1944 |
| 2,438,884 | Kropp | Mar. 30, 1948 |